Nov. 15, 1960  C. B. SCOTTY  2,960,651
ELECTRIC LOGGING SYSTEM
Filed Dec. 3, 1956
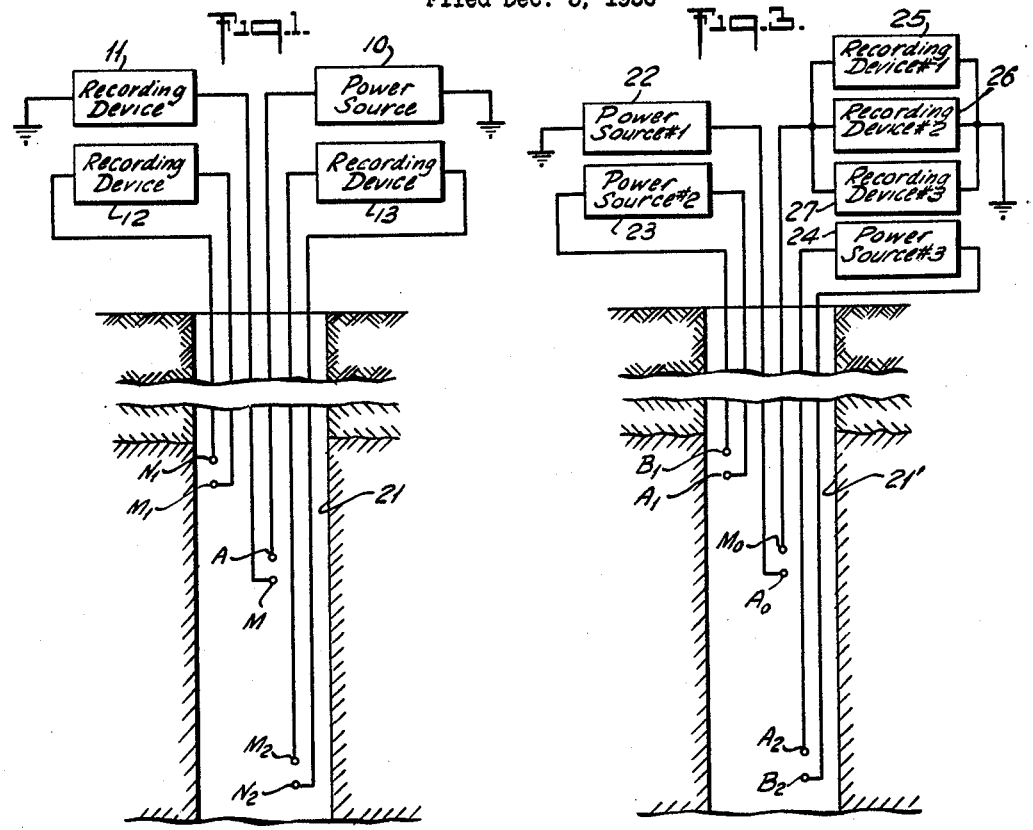
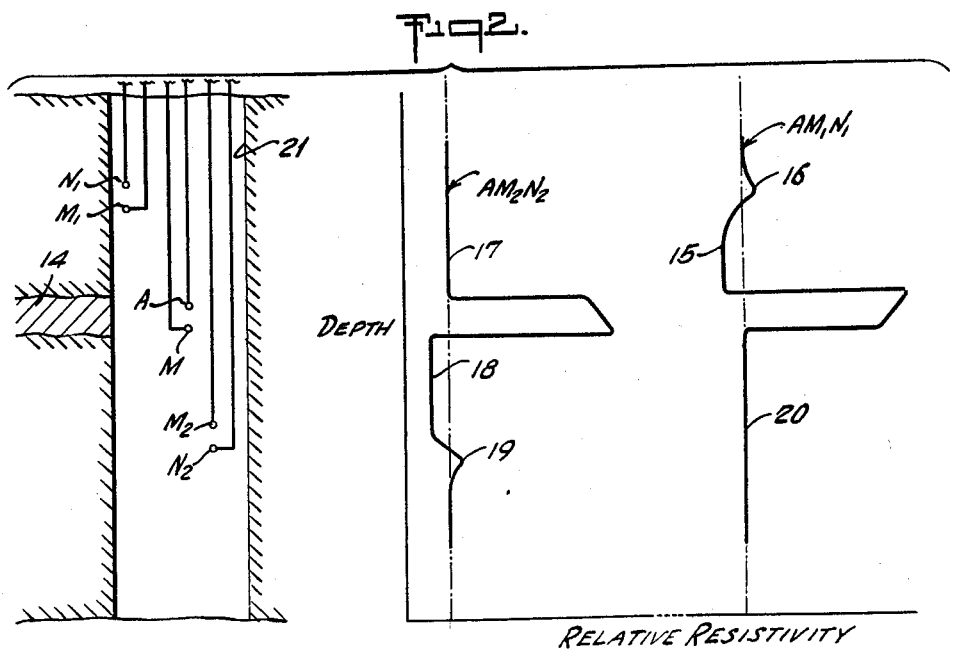

United States Patent Office 2,960,651
Patented Nov. 15, 1960

2,960,651

ELECTRIC LOGGING SYSTEM

Clarence Bernard Scotty, Bellaire, Tex., assignor to Texaco Inc., a corporation of Delaware Filed Dec. 3, 1956, Ser. No. 626,016

6 Claims. (Cl. 324—1)

This invention relates to apparatus for electrically logging boreholes and more particularly to an improved electric logging system having an electrode arrangement which provides more information about subsurface formations than that obtained from prior art electric logging apparatus.

The use of electric logs for quantitative estimation of oil in subsurface formations requires a knowledge of the true resistivity of the formations. The resistivity curves obtained from electric logging apparatus give only an apparent resistivity of the formation. This apparent resistivity must be corrected to provide the true resistivity before the information is useful in a quantitative interpretation. The factors which influence the resistivity curve are: (1) type of electrode arrangement; (2) ratio of electrode spacing to bed thickness; (3) ratio of electrode spacing to hole size or diameter; (4) ratio of mud resistivity to formation resistivity; and (5) degree of invasion into a subsurface formation by mud filtrate. From the number of factors which influence the resistivity curves it can be readily seen that any one curve can not always be corrected to obtain the true resistivity of a given subsurface formation. For this reason electric logging systems are generally designed to record simultaneously a plurality of resistivity curves.

It has become common practice in the investigation of subterranean formations to employ an electric logging system having an electrode arrangement which produces simultaneously three resistivity curves. This prior art system has a reference electrode, adapted for movement in the borehole, connected to one terminal of a power source, the other terminal of the power source being connected to ground and a second electrode spaced a short distance from the reference electrode, for example 16 inches, which is connected to one terminal of a recording device, the other terminal of the meter being connected to ground. This prior art logging system also includes a third electrode spaced a greater distance from the reference electrode than is the second electrode, for example 5 feet, which is connected to one terminal of a second recording device, the other terminal of said second recording device being connected to ground, and fourth and fifth electrodes each spaced from the reference electrode a distance substantially greater than the distance between the third electrode and the reference electrode, for example about 18 feet, the distance between the fourth and fifth electrodes being small compared with the distance from the midpoint between the fourth and fifth electrodes to the reference electrode, each of the fourth and fifth electrodes being connected to a different terminal of a third recording device.

The three resistivity curves are produced by the three recording devices in the system. The first resistivity curve produced by the first recording device provides a log indicating resistances from a small radius of investigation which is approximately only twice the distance between the first electrode and the reference electrode. This first curve provides detailed information which is useful for correlation purposes since it provides a clear indication of the interfaces between the adjacent subsurface formations. However, this first resistivity curve is greatly influenced by the mud resistivity and the mud cake and mud filtrate when present on or in a formation and, therefore, it does not provide useful indications of apparent resistivity for deriving the true resistivity of a formation. The second resistivity curve produced by the second recording device indicates resistances from a radius or depth of investigation substantially greater than that of the first resistivity curve and therefore is influenced by the mud, mud cake and mud filtrate less than is the first resistivity curve. This second curve provides good indications of the resistance of beds which are substantially thicker than the spacing between the third electrode and the reference electrode but the resistances of subsurface formations having thicknesses substantially less than the spacing between the third electrode and the reference electrode are not accurately indicated by this curve because the curve can merely indicate the average resistance of all the beds or formations disposed between the reference electrode and a point at a distance substantially equal to twice the distance between the reference electrode and the third electrode. The third resistivity curve produced by the third recording device indicates resistances from a large radius of investigation and thus provides clear resistivity measurements for all subsurface formations except formations having a thickness substantially equal to the distance from the midpoint between the fourth and fifth electrodes and the reference electrode and formations adjacent to thin low-resistance formations. The third recording device records unreliable low resistance values for formations having a thickness substantially equal to the distance from the midpoint between the fourth and fifth electrodes and the reference electrode. Although the third recording device produces a resistivity curve which provides a good indication of the resistivity of a thin high resistance formation, the third recording device fails to indicate an acceptable resistivity of a formation adjacent the thin high resistance formation. The third resistivity curve produces a shadow or blind zone in this area of investigation which appears on the curve as a low flat resistivity for a distance from the thin high resistance formation which is approximately equal to the electrode spacing, as more fully explained on page 103 in the Oil and Gas Journal of November 30, 1953, in an installment of a series of articles relating to electric logging by R. I. Martin. This indication of a low resistance is due to the screening effect caused by the thin high resistance formation when it is interposed between the reference electrode and the fourth and fifth electrodes. Following the indication of the low flat resistivity in the blind zone is a reflection peak which is produced when the reference electrode enters the high resistance formation and which reaches a maximum when the reference electrode is passing out of the high resistance formation into the adjacent formation. This peak is due to the disturbing effect of the high resistance formation and does not correspond to any change in lithology in the vicinity of the fourth and fifth electrodes.

It is an object of this invention to produce an electric logging system which provides more information about the subsurface formations traversed by a borehole than that produced by prior art electric logging apparatus.

Another object of this invention is to provide an electric logging system which permits a complete log interpretation of a borehole from the bottom thereof up to the borehole casing seat.

A further object of this invention is to provide an electric logging system which provides a more accurate picture of bed or subsurface formation uniformity.

A still further object of this invention is to provide an electric logging system which will yield resistivity curves that are more useful for geological correlation.

Still another object of this invention is to provide an electric logging system which will yield resistivity curves that are more useful for quantitative determination of fluid content than curves obtained from prior art systems.

Accordingly, the present invention provides an electric logging system which includes a reference electrode adapted to be moved through a well bore, means having a large radius or depth of investigation for indicating the potential difference between two relatively closely spaced points disposed on one side of the reference electrode within the borehole and means having a radius or depth of investigation substantially greater than the previously mentioned radius of investigation for determining the potential difference between two relatively closely spaced points disposed in the borehole on the other side of the reference electrode.

In order that the invention may be more clearly understood and readily carried into effect, it will now be described more fully with reference to the accompanying drawing in which Fig. 1 is a schematic drawing of the well logging system constructed according to the invention;

Fig. 2 shows two resistivity curves taken in the vicinity of a thin high resistance subsurface formation; and Fig. 3 is a schematic drawing of a reciprocal arrangement of the system illustrated in Fig. 1.

Referring to the drawing and more particularly to Fig. 1 thereof, the electric logging system comprises a reference or current emitting electrode A adapted for movement through a borehole 21 and connected to one terminal of a power source 10, the other terminal of the power source 10 being connected to a reference point such as ground, a first potential electrode M spaced a relatively short distance, for example, 16 inches, from current electrode A, the potential electrode M being connected to one terminal of a recording device 11 located at the surface of the earth, the other terminal of the recording device 11 being connected to ground, potential electrodes $M_1$, $N_1$ disposed on one side of the reference electrode A and spaced a relatively short distance from each other and at a relatively large distance, for example 10 feet, from reference electrode A, each of the potential electrodes $M_1$, $N_1$ being connected to different terminals of a recording device 12, and potential electrodes $M_2$, $N_2$ disposed on the other side of the reference electrode A and spaced a relatively short distance from each other and a distance from the reference electrode A which is substantially greater than the distance between the reference electrode A and the potential electrodes $M_1$, $N_1$, each of the potential electrodes $M_2$, $N_2$ being connected to a different terminal of a third recording device 13.

In the logging system of this invention the recording device 11 will produce a curve which gives detailed information of the subsurface formations due to the small depth of investigation. This curve is similar to the first resistivity curve produced by the above-mentioned prior art system and therefore is primarily useful for correlation purposes. Recording device 12 produces a second resistivity curve which indicates resistances from a large radius of investigation. The second curve provides good indications of resistivities for all formations except formations having a critical thickness, that is, formations having a thickness equal to the distance between the reference electrode A and the midpoint between the potential electrodes $M_1$, $N_1$, and formations lying adjacent to and above thin high resistance formations, that is, high resistance formations having a thickness substantially less than the critical thickness. The third recording device 13 produces a third resistivity curve which indicates resistances from a radius of investigation substantially greater than the radius of investigation of the curve produced by recording device 12. The third resistivity curve provides a good indication of the resistivity of all the formations traversed by the borehole 21 with the exception of formations having a bed thickness equal to the critical thickness, i.e., the distance from reference electrode A to the midpoint between potential electrodes $M_2$, $N_2$, and formations adjacent and below thin high resistance formations.

Fig. 2 shows the electrode arrangement of Fig. 1 in the borehole 21 when the system is logging in the vicinity of a thin high resistance bed 14. Fig. 2 also shows two resistivity curves $AM_1N_1$ and $AM_2N_2$, one of the curves $AM_1N_1$ being produced by the electrode arrangement A, $M_1$, $N_1$ and the recording device 12, the other curve $AM_2N_2$ being produced by the electrode arrangement A, $M_2$, $N_2$ and the recording device 13. In each of these curves $AM_1N_1$, $AM_2N_2$ there exists a shadow or blind zone. However, these blind zones are not recorded at the same depth or area in the borehole 21. It can readily be seen that when a shadow or blind zone 15 and a reflection peak 16 is recorded above the thin high resistance bed 14 by curve $AM_1N_1$, the curve $AM_2N_2$ provides an accurate log of this area as shown on curve $AM_2N_2$ at the straight vertical portion 17 thereof. When the resistivity curve $AM_2N_2$ is recording a shadow or blind zone 18 and a reflection peak 19 below the thin high resistance bed 14 the straight vertical portion 20 of curve $AM_1N_1$ provides an accurate resistivity measurement in the formation adjacent to and below the thin formation 14. Consequently, these two curves supplement one another to minimize the possibility of missing or not detecting a bed of interest which may lie in the blind zone of one of the curves.

It can readily be seen that the electrical logging system of the present invention will provide more information about the subsurface formations traversed by a borehole than that produced by prior art logging apparatus. The system of the invention utilizes the potential electrode M to provide detailed information for purposes of correlation. The potential electrodes $M_1$, $N_1$ are disposed to provide true resistivity values for all subsurface formations except those formations which have a thickness approximately equal to the critical thicknesses and those formations which lie adjacent to and above thin high resistance formations. The potential electrodes $M_2$, $N_2$ are also disposed to provide accurate resistivity values of the subsurface formations but particularly to provide reliable resistivity measurements of the above-mentioned formations which are not reliably detected by the potential electrodes $M_1$, $N_1$. The spacing of potential electrodes $M_1$, $N_1$ and $M_2$, $N_2$ from the reference or current electrode A is not critical but should be sufficiently great to eliminate or at least minimize the effect of the mud, the mud cake or the mud filtrate on the resistivity measurements of the formations.

It should be understood that the power source 10 in Fig. 1 of the drawing may be either a direct current, preferably interrupted or pulsating, or an alternating current source. Furthermore, it should be realized that the system of the invention may be modified to provide a spontaneous potential curve in addition to the three resistivity curves mentioned herein. To obtain the spontaneous potential curve from the logging system the power source 10 may be an alternating current source and a suitable direct voltage recording device may be additionally connected to one of the potential electrodes disposed in the borehole.

As is well known in the art, the logging system may be modified by replacing each power source with a recording device and each recording device with a power source without disturbing the results of a given log. This rearrangement is based on the reciprocity theorem which states that in a circuit having four terminals the difference in potential between any two of these terminals caused by the passage of current between the other two terminals is equal to the difference in potential between the other two terminals due to the passage of the same current between the first two terminals.

The reciprocal arrangement of Fig. 1 is illustrated in Fig. 3 of the drawing wherein the electric logging system of the invention comprises a current electrode $A_0$ adapted for movement through a borehole 21′ and connected to one terminal of a first power source 22 having a first frequency, the other terminal of the first power source 22 being connected to a reference point such as ground, current electrodes $A_1$, $B_1$ are connected to a second power source 23 having a second frequency and current electrodes $A_2$, $B_2$ are connected to a third power source 24 having a third frequency. The system also includes a potential electrode $M_0$ disposed in the borehole 21′ in fixed spacial relationship to the other electrodes, the potential electrode $M_0$ being connected to one terminal of each of three recording devices 25, 26, 27, the other terminal of each of the three recording devices 25, 26, 27 being connected to a reference point such as ground. The first recording device 25 is made responsive to only the frequency of the first power source 22, the second recording device 26 is made responsive to only the frequency of the second power source 23 and the third recording device 27 is made responsive to only the frequency of the third power source 24. In this manner it can be readily seen that the three recording devices will produce three resistivity curves similar to the resistivity curves produced by recording devices 11, 12 and 13 of Fig. 1.

Obviously, many modifications and variations of the invention as hereinabove set forth may be made without departing from the spirit and scope thereof and therefore only such limitations should be imposed as are indicated in the appended claims.

I claim:

1. An electric logging system comprising a first electrode adapted to be moved through a borehole traversing subsurface formations, a first electrical circuit connected at one terminal to said electrode and at another terminal to a reference point, a first pair of electrodes disposed on one side of said first electrode at a given distance therefrom for movement in fixed spaced relationship therewith, a second electrical circuit independent of said first circuit and connected solely between said pair of electrodes, a second pair of electrodes disposed on the other side of said first electrode at a fixed distance therefrom substantially greater than said given distance, a third electrical circuit connected solely between said second pair of electrodes, a source of electric energy being included in at least one of said electrical circuits and means for indicating the resistivity of the subsurface formations at said first pair of electrodes and at said second pair of electrodes, respectively, being included in the other of said electrical circuits.

2. An electric logging system comprising a first electrode adapted to be moved through a borehole, a first electrical circuit including a source of electric energy connected at one terminal to said electrode and at another terminal to a reference point, a first pair of electrodes disposed on one side of said first electrode at a given distance therefrom for movement in fixed spaced relationship therewith, a second electrical circuit independent of said first circuit and connected solely between said first pair of electrodes and including first means for measuring the voltage between said pair of electrodes, a second pair of electrodes disposed on the other side of said first electrode at a fixed distance therefrom substantially greater than said given distance, and a third electrical circuit independent of said first circuit and said second circuit and connected solely between said second pair of electrodes and including second means for measuring the voltage between said second pair of electrodes.

3. An electric logging system comprising a first electrode adapted to be moved through a borehole traversing subsurface formations, a first electrical circuit connected at one terminal to said electrode and at another terminal to a reference point, a first pair of electrodes disposed on one side of said first electrode at a given distance therefrom for movement in fixed spaced relationship therewith, a second electrical circuit including a first source of electrical energy independent of said first circuit and connected between said pair of electrodes, a second pair of electrodes disposed on the other side of said first electrode at a fixed distance therefrom substantially greater than said given distance, and a third electrical circuit including a second source of electrical energy independent of said first and said second circuits and connected between said second pair of electrodes, said second source having a frequency other than that of said first source, said second source being connected between said second pair of electrodes, said first electrical circuit including means responsive to each of the frequencies of said sources of electrical energy for indicating the resistivity of the subsurface formations at said first and second pairs of electrodes, respectively.

4. An electrical logging system comprising a first electrode adapted to be moved through a borehole traversing subsurface formations, a first electrical circuit connected at one terminal to said electrode and at another terminal to a reference point, a second electrode disposed in fixed closely spaced relationship with said first electrode, a second electrical circuit independent of said first circuit connected at one terminal to said second electrode and at the other terminal to a reference point, a first pair of electrodes disposed on one side of said first electrode at a given distance therefrom considerably greater than the distance between said first and second electrodes for movement in fixed spaced relationship therewith, a third electrical circuit independent of said first and second circuits connected solely between said pair of electrodes, a second pair of electrodes disposed on the other side of said first electrode at a fixed distance therefrom substantially greater than said given distance, and a fourth electrical circuit independent of said first, second and third circuits and connected solely between said second pair of electrodes, a source of electrical energy being included in at least one of said electrical circuits and means for indicating the resistivity of the subsurface formations at said second electrode, said first pair of electrodes and said second pair of electrodes, respectively, being included in the other of said electrical circuits.

5. An electrical logging system comprising a current electrode adapted to be moved through a borehole, an electrical circuit including a source of electric energy connected at one terminal to said current electrode and at another terminal to a reference point, means for indicating a potential difference solely between two points disposed on one side of said current electrode spaced in fixed relatively close relationship to each other but each being a great distance from said current electrode, and means for indicating a potential difference solely between two points disposed on the other side of said current electrode spaced in fixed relatively close relationship to each other but each at a distance greater than said great distance from said current electrode.

6. An electric logging system comprising a current electrode adapted to be moved through a borehole, an electrical circuit including a source of electric energy connected at one terminal to said current electrode and at another terminal to a reference point, means for indicating the potential at a point spaced in fixed relatively close relationship to said current electrode, means for indicating the potential difference between two points only disposed on one side of said current electrode and spaced in fixed relatively close relationship to each other but each being a great distance from said current electrode, and means for indicating a potential difference between two points only disposed on the other side of said current electrode and spaced in fixed relatively close relationship to each other but each being at a distance substantially greater than said great distance from said current electrode.

References Cited in the file of this patent

UNITED STATES PATENTS

| | | |
|---|---|---|
| 2,415,364 | Mounce | Feb. 4, 1947 |
| 2,562,992 | Schlumberger | Aug. 7, 1951 |
| 2,653,294 | McMillan | Sept. 22, 1953 |
| 2,730,672 | Mounce | Jan. 10, 1956 |